(12) United States Patent
Cameron et al.

(10) Patent No.: US 8,955,739 B2
(45) Date of Patent: Feb. 17, 2015

(54) BARCODE SCANNER ON WEBPAGE

(71) Applicants: Jon Cameron, Dallas, TX (US); Howard Brawdy, Dallas, TX (US)

(72) Inventors: Jon Cameron, Dallas, TX (US); Howard Brawdy, Dallas, TX (US)

(73) Assignee: Best Buzz, LLC, Dallas, TX (US)

( * ) Notice: Subject to any disclaimer, the term of this patent is extended or adjusted under 35 U.S.C. 154(b) by 0 days.

(21) Appl. No.: 13/828,111

(22) Filed: Mar. 14, 2013

(65) Prior Publication Data

US 2013/0200145 A1 Aug. 8, 2013

Related U.S. Application Data

(62) Division of application No. 13/136,537, filed on Aug. 4, 2011, now abandoned.

(60) Provisional application No. 61/477,829, filed on Apr. 21, 2011.

(51) Int. Cl.
*G06F 17/00* (2006.01)
*G06K 7/10* (2006.01)
*G06K 7/14* (2006.01)
*G06F 17/30* (2006.01)

(52) U.S. Cl.
CPC .... *G06F 17/30879* (2013.01); *G06F 17/30002* (2013.01)
USPC .............. 235/375; 235/454; 235/462.01

(58) Field of Classification Search
USPC .................................. 235/375, 454
See application file for complete search history.

(56) References Cited

U.S. PATENT DOCUMENTS

| | | | |
|---|---|---|---|
| 5,978,773 A | 11/1999 | Hudetz | |
| 6,027,024 A | 2/2000 | Knowles | |
| 6,076,733 A | 6/2000 | Wilz, Sr. | |
| 6,266,649 B1 | 7/2001 | Linden | |
| 6,430,554 B1 | 8/2002 | Rothschild | |
| 6,448,979 B1 | 9/2002 | Schena | |
| 6,542,933 B1 | 4/2003 | Durst, Jr. | |
| 6,736,322 B2 | 5/2004 | Gobburu | |
| 6,753,883 B2 | 6/2004 | Schena | |
| 6,766,363 B1 | 7/2004 | Rothschild | |
| 6,865,608 B2 | 3/2005 | Hunter | |
| 6,993,573 B2 | 1/2006 | Hunter | |
| 7,156,311 B2 | 1/2007 | Attia | |
| 7,206,820 B1 | 4/2007 | Rhoads | |
| 7,496,638 B2 | 2/2009 | Philyaw | |
| 7,890,368 B2 | 2/2011 | Lambert | |
| 7,917,390 B2 | 3/2011 | Feinberg | |
| 7,945,476 B2 | 5/2011 | Subramanian | |
| 2002/0000468 A1* | 1/2002 | Bansal | ............... 235/462.15 |
| 2007/0181691 A1 | 8/2007 | Chang | |

\* cited by examiner

FOREIGN PATENT DOCUMENTS

| | | |
|---|---|---|
| WO | WO/00/43862 A1 | 1/2000 |
| WO | WO/00/70585 A1 | 11/2000 |
| WO | WO/2004/080097 A1 | 9/2004 |

OTHER PUBLICATIONS

Mearian, Lucas. "Carbonite app enables remote activation of Android cell phone cameras." Computerworld. Dec. 11, 2012. Web. Jun. 15, 2014.*

*Primary Examiner* — Michael G Lee
*Assistant Examiner* — Suezu Ellis

(57) ABSTRACT

A hybrid electronic barcode reader application sharing the processes between document formats of the world wide web with associated native executables or hardware from a mobile device. The two disparate platforms exchange information between the mobile device and web page and allow the web page to operate device hardware to complete the application. The focus then returns to the originating web page.

20 Claims, 3 Drawing Sheets

BARCODE SCANNER ON WEBPAGE

BACKGROUND

1. Field of Invention

Figure 1A:
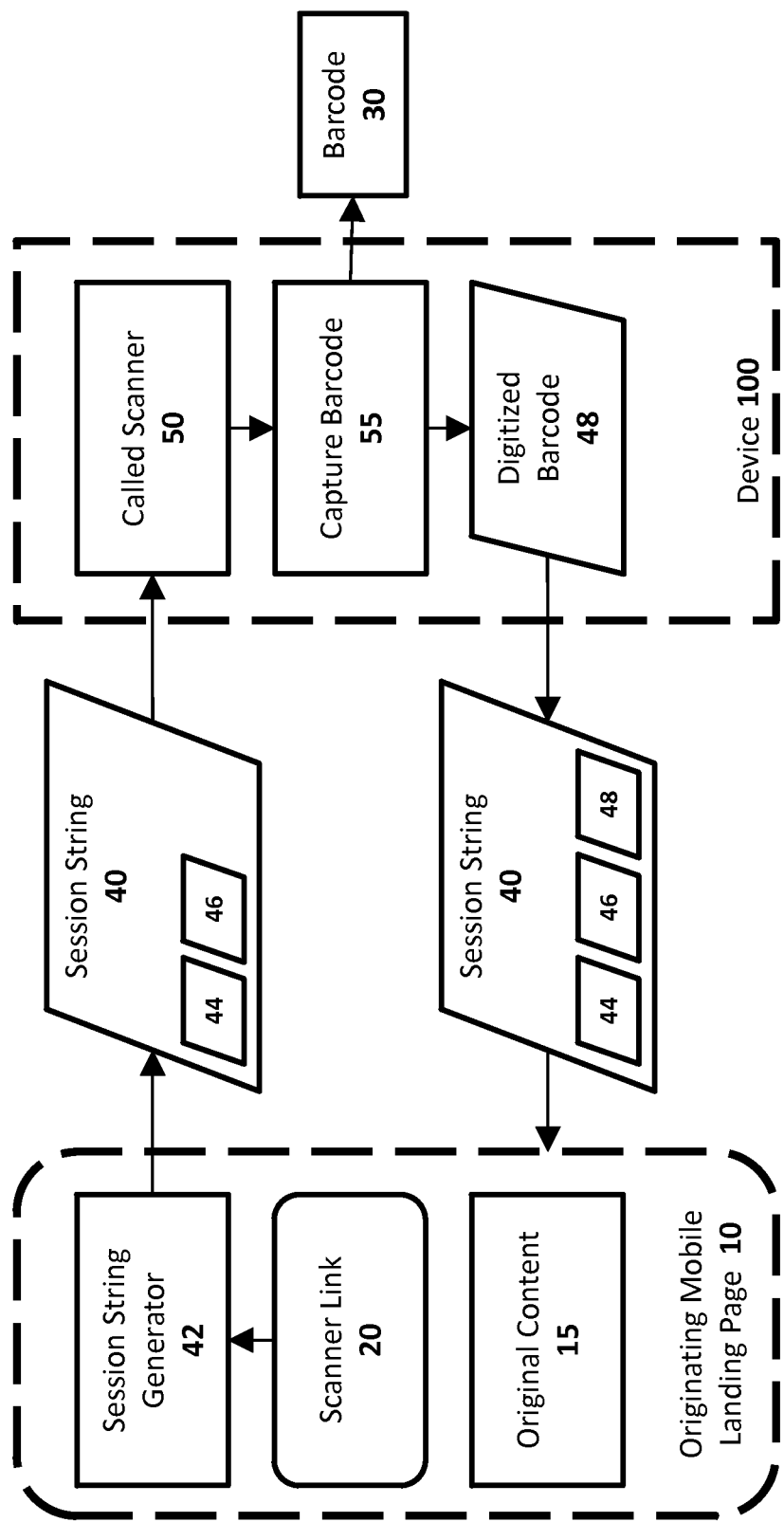

The invention related to the system and method of initiating a barcode scan from a landing page.

2. Background of the Invention

The present invention is a useful and novel method for adding new barcode scanning capabilities to mobile landing pages. Mobile barcode scanners have previously been constrained to software applications associated and stored on the mobile device. Landing pages were unable to simulate the results of mobile barcodes scanners because they didn't have access to the hardware required.

Landing Pages

Mobile landing pages, or landing pages, are a collection of images, files, data, text, links, movies, applications or clips located in a single address on the internet. Mobile landing pages are designed to detect the type of device, including make and model, and then setting the screen width to match the physical size of the device's screen. Mobile landing pages provide a variety of unique challenges for the developer including brevity of the copy on a single page; legible text and images without zooming; using only mobile-friendly plug-ins; call-friendly phone number using click-to-call; map linked to address; links are large enough to be thumb-friendly with zooming; favoring local content using geographic identification technologies; and keeping fillable forms brief.

Applications tied to the webpage began to grow in popularity after Google's successful implementation of HTML5-based apps. The competitive advantage for web-based application was the ability to expand audience reach and quickly issue version updates.

Native Mobile Applications

A native mobile application (or "app") is software written for mobile devices that performs a specific task, such as a barcode scanner, game, calculator, music player, etc, The application is specifically designed to run on a device's operating system and machine firmware therefore an app must be adapted for different devices. Apps exploded in popularity in 2008 when Apple introduced the "App Store." Apple solved many app development impediments by providing a standardized software development kit (SDK) to third-party developers and then providing a built-in billing feature through Apple iTunes.

Although not supported quantitatively, native mobile applications are largely viewed as the more successful platform compared with web-based applications. There are approximately five hundred thousand (500,000) native mobile applications currently offered today. However, there are relatively poor statistics on the number of web apps for making a direct comparison.

As smartphone technology evolves two different camps of development have formed. One vision sees the development of web-based applications as the future of mobile application development. Web applications can be developed without the restrictions inherent in native mobile application approval. Web applications also are platform independent so developers don't have the burden of writing the application in all the available operating systems. As of this writing, there are a dozen different mobile operating systems. So writing to web-based applications is cheaper, faster and easier than native applications. However, web applications have a perception problem with consumers. They view the web as place for a quick one-time data feed. For repeated needs, consumers turn to native applications.

Other developers believe the early trend of natively installed applications will maintain its dominance in how technology is delivered. Much of this opinion has to do with the significant resources already committed to the approach by developers. Updating a dozen platforms is seen as a given instead of an obstacle. Additionally, current native programming allows for more sophisticated look, feel and functionality than web-based applications.

The New York Times pontificated on the conflict between the two development styles and declared, "THE Web is poised for a comeback." That may be an exaggeration of the rife between the camps, but we believe new Hyper Text Markup Language (HTML) will blur the distinction to the consumer. Since they are both presented on the same mobile screen, consumers will find it more and more difficult to differentiate between a native application and a web-based application. This will lead marketers to ask if the current nature of web applications is more important than technology flashiness.

The ability to combine the mobile phone's hardware into landing page capabilities has been previously limited by operating system functionality, carrier limitations, and artificial technical restrictions adopted by application distributors. We anticipate we will see these restrictions soften and then finally fall away. This will provide new capabilities to streamline the interface between executables on a webpage and the required application+hardware resources on the device.

Resource Sharing Between Landing Pages and Mobile Application

There are limited examples of resource sharing by a mobile landing page and native applications on the mobile device. The two most common examples are related to mapping capabilities and the out-call function of the telephone. For instance, a user would perform an internet search for "ABC Plumbing" which returns a listing of various plumbing companies using the name. The search page may display a telephone number that can be dialed by clicking on the number and the user confirming they wish to call. The user may also find a similar phone on the landing page of the "ABC Plumbing's" website. Like the search engine, the user only needs to click the phone number and confirm the desire to complete the call. When the call is ended, the user remains in the phone application until they give the commands to toggle away.

Similarly, a user can click on an address or map in the internet search page and be routed to one of three options:

1. An on-line mapping tool,
2. An embedded map in the landing page,
3. A native application stored on the mobile device.

In the third option, the address is transferred to the local mapping application and the application is automatically launched. Like in the telephone example, the user remains in the mapping application until they toggle away.

The addressable problem with these current implementation examples is the mobile landing page loses focus which is undesirable for marketers and developers. Marketers want to maintain the longest possible engagement with the end user. Not only is "time spent" on a mobile landing page a common measure of design success, the mobile forum is a rare opportunity to engage a consumer without distracting outside advertising messages. So marketers are hesitant to send the consumer to an outside resource they don't control directly.

Programming the Data Pass Between the Web Page and the Native Application

Passing data between mobile landing pages and native applications is inherently difficult and can lead to a skewing of the associated reporting data. For instance, if a user were to click a link in a native social media application, the application does not transmit the referral information to the web page. The webpage would read the referral as a direct hit to the website and dramatically skew critical metrics.

When passing data from the mobile landing page to the application, there are several methods available to the programmer. For instance, a session key is a single-use alphanumeric string for encrypting communication within the same session. The purpose of the session key is two-fold. First, a session key is used to secure the communications between two computers or processors. Second, the session key is transmitted with each subsequent communication to provide a cohesive string of communication.

An application programming interface (API) is a system of rules and regulations for passing data between two unrelated software programs. These APIs are a combination of the proprietary information encoded in a standardized format.

A characteristic of all the programming techniques for passing data is they comprise an alphanumeric string, referred to as a session string in the present invention.

However, what is missing in the data pass is the ability to swap information from the webpage to the native application and back to the webpage. Take the example of a car dealership with a mobile landing page showing inventory on a particular lot. A consumer shopping the lot notices a car they wish to investigate for more information. For this process to work in a desirable manner:

1. The consumer would press a scan button on the mobile landing page;
2. The mobile landing page would call a mobile barcode scanner installed on the user device;
3. Using the scanner application installed on the user device, the consumer would scan the vehicle identification number (VIN) number of the automobile;
4. The scanner would pass the information to the originating mobile landing page;
5. The originating mobile landing page would then search the car dealer's inventory for the item and display the associated data on the dealer's mobile landing page.

However, steps 4 and 5 would not happen in the prior art. Instead, the scanner may parse the information, determine the brand and model of the VIN and route the consumer to a website that may be competitive with the owner of the originating mobile landing page. It may route the consumer automatically to a website preferred by the developer—such as insurance or vehicle history websites. If the consumer was routed to the originating dealership through a web search, it would likely happen by coincidence only. This then makes it undesirable for the dealership to use mobile barcode scanning technology on the mobile landing page. Instead the developers would have to explore less precise ways, and less desirable ways, for the consumer to find information on a vehicle on their lot.

All the previous designs for combining the resources of a mobile landing page with mobile device resources heretofore known suffer from a number of disadvantages:

1. The mobile landing page is unable to call hardware, such as a camera, on the native device.
2. The available hardware resources vary across mobile devices. One device might employ an auto focus camera and another device might have a single focus camera with automatic flash.
3. The programming code to call an application varies from mobile platform to mobile platform which requires additional programming considerations.
4. The applications a programmer can call from a mobile landing page vary from one platform to the next.
5. Multiple native applications perform the same function. If a mobile landing page wants to use a native tool for calculating a mortgage payment, the program could call a simple calculator or specialized mortgage calculator.
6. The native application can't return information to the mobile landing page. If the consumer determines a mortgage amount using a native calculator, the information would be contained to the native application. If the web-based application wished to store the information for later comparison by property, it would not be able to use the native application.

When the mobile landing page links to a native application, it is unable to force a return focus to the originating mobile landing page after the application's task is completed. So the mortgage consumer would be left in the calculator application until the user toggles back to the browser. This is a paramount concern of brand and website developers when considering if the landing page should use an outside application on the local mobile device.

SUMMARY OF THE INVENTION

An invention, which meets the needs stated above, is a system and method employing a native barcode scanning application, or camera, to add barcode scanning capabilities to a mobile landing page.

Objects and Advantages

Accordingly, besides the objects and advantages of the system for website calling a native application described above, several objects and advantages of the present invention are:

1. to provide access to hardware on the mobile device from a mobile landing page;
2. to provide a return to the originating landing page without manual toggling by the consumer;
3. to provide expanded development possibilities for mobile landing pages;
4. to provide a secure pass of data between the mobile landing page and the mobile device;
5. to provide a pass of data from the mobile landing page to a mobile device and then back to the mobile landing page.

Further objects and advantages of this invention will become apparent from a consideration of the drawings and the ensuing description of the drawings.

DRAWING FIGURES

The accompanying drawings, which are incorporated in and constitute a part of this specification, illustrate embodiments of the present invention and together with the description, serve to explain the principles of this invention. In the figures:

FIG. 1A.—Flow chart depicting the data movement between the originating mobile landing page and the device.

Figure 1B:
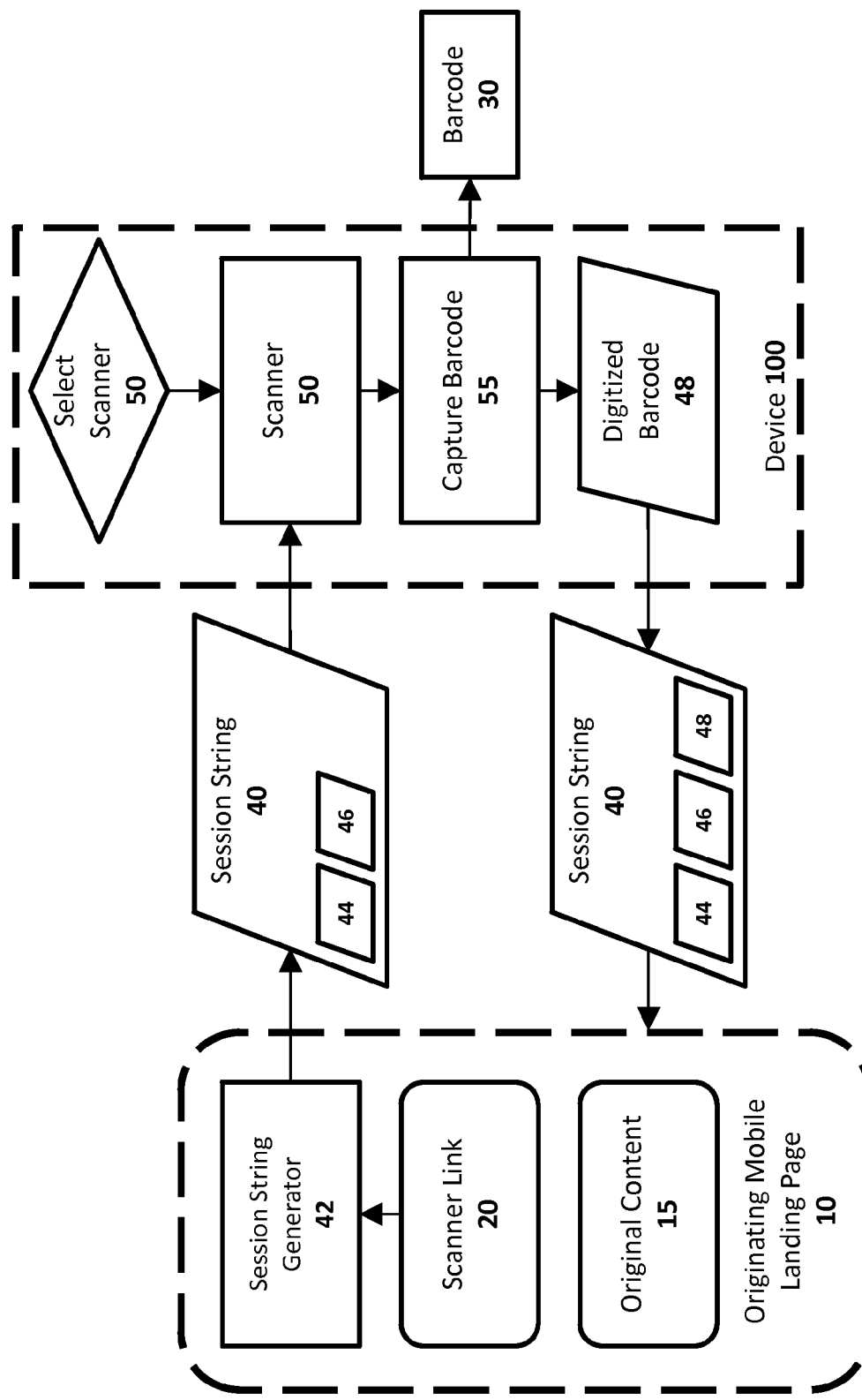

FIG. 1B.—Flow chart depicting the data movement between the originating mobile landing page and the scanner application.

Figure 2:
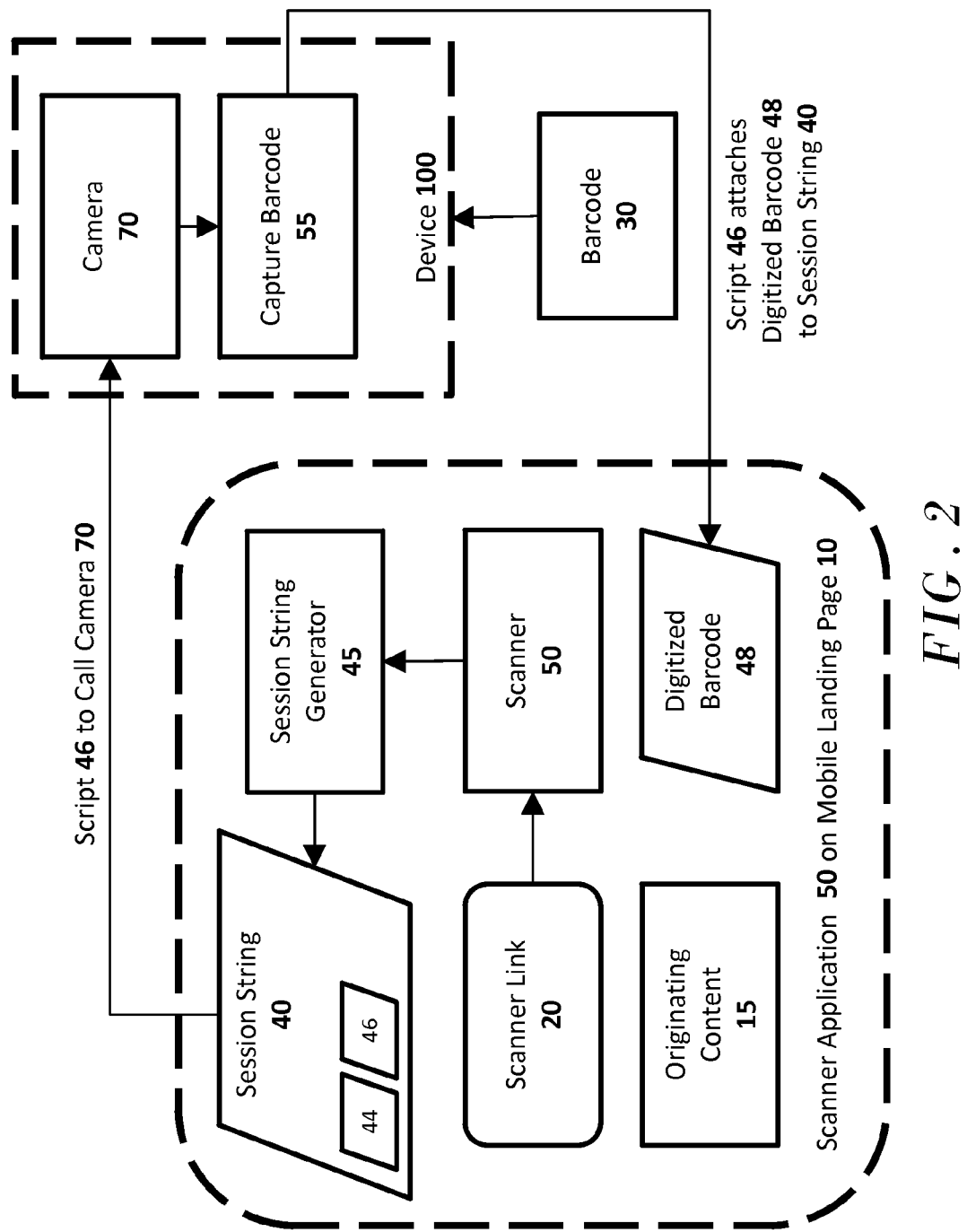

FIG. 2.—Flow chart depicting the data movement between the originating mobile landing page and the device's camera or camera application.

KEY TERMS mobile barcode scanner: an application located on a mobile device that initiates the native camera hardware, identifies a physical barcode, and collects a digital representation of the barcode. Generally, the representation is in the form of an alphanumeric string encoded in the barcode, but it may also be a photographic image or motion video of the barcode.

session string: an alphanumeric string containing instructions and data for the entire communications session. The information in the session string may not be static and comprises the address of the originating mobile landing page; a script of instructions to software and hard components; data extracted from the barcode and/or images; and/or a unique identifier of the entire communications session.

script: an alphanumeric string, containing instructions, passed from the mobile landing page to the barcode scanner/camera application and then back to the mobile landing page.

landing page: A location on the internet where a visitor first encounters a website, but more broadly, is any page on a website. For the purposes of this invention, mobile landing page will encompass any page on a website that offers a scanner link.

REFERENCE NUMERALS IN DRAWINGS

10 Originating mobile landing page, landing page
15 Originating content, original content
20 Scanner link
30 Physical barcode, barcode
40 Session string
42 Session string generator
44 Address of originating mobile landing page
46 Script
48 Digital representation of scanned barcode, digitized barcode, barcode data
50 Mobile barcode scanner, scanner
55 Capture barcode, scanning
70 Camera, camera application
100 Device Detailed Description of the Drawings Referring to the drawings, in which like numerals represent like elements,

FIG. 1A-1B

Turning to FIG. 1A, the logic flow chart depicts the software processes related to a landing page 10 calling a predetermined barcode scanner 50 application native on the device 100. The flow chart shows how the mobile landing page 10 interacts with the device 100 and mobile scanner application 50.

Starting on the left side of the flow chart, the invention begins with an originating mobile landing page 10. This landing page 10 comprises any webpage containing a scanner link 20 originating the process of scanning 55 a barcode 30. The landing page 10 will have original content 15 besides the scanner link 20. The content 15 comprises text or images which may comprise a notice of scanner 50 availability and directions on how to use the scanner 50.

The present invention is based on the originating mobile landing page 10 offering a link to a barcode scanner 50. This barcode scanner link 20 has the function of initiating the sequence of events to capture a barcode 55 using a camera 70 on a mobile device 100. In order to allow the user to access the scanner 50 and then automatically return to the originating landing page 10, the scanner link 20 uses a session string generator 42 to create a session string 40. The session string 40 is an alphanumeric attribute string acting as a carrier of data and instructions for the entire communications session. The session string 40 facilities the passing of information across the assortment of platforms, software, hardware and devices. The session string 40 is not fixed and may add and subtract information from the string as it passed across the assorted hardware and software applications associated with scanning 55 a barcode.

The session string generator 42 first creates the session string 40 comprising the address of the originating mobile landing page 44 and a script 46. A first portion of the session string 40 is the alphanumeric address of the originating mobile landing page 44 which may be in the form of a uniform resource locator (URL), tiny URL, domain name, numeric internet protocol address, or any other form of an address to a web location. The address of the originating mobile landing page 44 allows the present invention to return the user to the originating mobile landing page 10 after scanning 55 of the barcode 30.

A second component generated by the session string generator 42 is a script 46. A script 46 is any alphanumeric string used to pass instructions, and associated data, from the mobile landing page 10 to the barcode scanner 50, or camera 70, and then returned it back to the mobile landing page 10. In this figure, we are passing the data to a barcode scanner 50 application. In FIG. 3, we will look at how the script 46 works when calling a camera 70, or camera application 70, instead of the mobile barcode scanner 50 application.

Therefore, the data in the session string 40 comprises the address of the originating mobile landing page 44 and a script 46 of instructions to the software and hardware components. It may also comprise a unique identifier, such as an index, of the entire communications session.

Once the session string generator 42 creates the session string 40, it is sent to the device 100 where the script 46 calls the scanner 50 and then instructs the scanner 50 to capture a barcode 55. The camera hardware is wrapped in software code that may be used to operated the camera hardware. In layman terms, the script 46 instructs the device 100 and/or mobile barcode scanner application 50 to:

1. Activate the predetermined mobile barcode scanner application 50;
2. Look for a barcode 30 image;
3. Capture the barcode 55;
4. Digitize the barcode 48;
5. Add the digitized barcode 48 to the session string 40;
6. Pass the session string 40 to the originating landing page 10.

Capturing the barcode 30 is completed by the mobile barcode scanner 50 by using the device's 100 camera 70. The remainder of the normal functions of the mobile barcode scanner 50, such as retrieving a web page or running a price comparison, are eliminated in the present invention. After passing the session string 40 with the digitized barcode 48 to the mobile landing page 10, the application's role is complete.

The digitized barcode 48 is generally executed by decoding the physical barcode 30 into an alphanumeric sequence. However, it can also be completed with a capture 55 of a still or moving image. This second method would then require another program located on the originating mobile landing page 10 to decode the image into the alphanumeric string.

This process then alters the session string 40 by adding the digitized barcode 48 information so the session string 40 now comprises:

1. Address of the originating mobile landing page 44
2. Script 46
3. Digital representation of scanned barcode 48

This session string 40 is then passed back to the originating mobile landing page 10 and the focus returns to the mobile landing page 10 located in the session string 40. The landing page 10 can further use the digitized barcode 48 to perform an endless variety of functions, such as:
1. Display the results of the scan;
2. Search the website using the barcode 30 data;
3. Search the web using the barcode 30 data.

Referring now to FIG. 1B, the logic flow chart demonstrates the software processes related to a mobile landing page 10 calling a undetermined barcode scanner 50 application native to the device 100.

While the figure differentiates the two platforms of landing page 10 and device 100, it should be further understood the image of the mobile landing page 10 is displayed on the device 100.

FIG. 1B varies from FIG. 1A in that the barcode scanner 50 is not preselected by the script 46 or the preselected barcode scanner 50 is not available on the device 100. So once the session string 40 is passed to the device 100, the device's 100 operating system would assist in locating a mobile barcode scanner 50 capable of completing the transaction. A number of variations and modifications of the invention can also be used to select the scanner 50. For example:
1. Ask user to download application specified in the script 46;
2. Automatically select preferred barcode scanner application 50 already stored on the device 100;
3. Automatically download a preferred barcode scanner application 50 preferred by the device's 100 operating system.
4. Ask the user to select a preferred barcode scanner 50 already stored on the device 100.

The barcode scanner 50 may be selected by the user, the device's 100 operating system, or a combination of both.

In layman terms, this additional step alters how the script 46 instructs the device 100 or mobile barcode scanner application 50 to:
1. If scanner 50 is not available, select scanner 50;
2. Activate the selected mobile barcode scanner application 50;
3. Look for a barcode 30 image;
4. Capture the barcode 55;
5. Digitize the barcode 48;
6. Add the digitized barcode 48 to the session string 40;
7. Pass the session string 40 to the originating landing page 10.

FIG. 2

Finally, turning to FIG. 2B depicting the data movement between the originating mobile landing page 10 and the device's 100 camera 70 or camera application 70.

In this embodiment, the mobile landing page 10 and the device 100 still share resources, but the barcode scanner application 50 resides on the mobile landing page 10.

The mobile landing page 10 will display the originating content 15 and a scanner link 20. The content 15 comprises text or images which may also comprise a notice of scanner 50 availability and/or directions on how to use the scanner 50.

The mobile landing page 10 will be displayed on the device 100 where the camera application 70 is native.

The camera 70 hardware would generally be wrapped with an application. However, in one embodiment of the present invention, the camera 70 is directly operated by a scanner 50 on the mobile landing page 10.

Once the scanner link 20 is activated by the user, the scanner 50 is launched on the mobile landing page 10. The scanner 50 initiates the session string generator 45 to create the session string 40 to pass to the camera 70. The session string 40 would comprise a script 46 to operate with the device's 100 operating system and may also include the address of the originating mobile landing page 44.

The script 46 activates the camera 70 or camera application 70 and then instructs the hardware device to scan the physical barcode 30 and pass the digitized barcode 48 to the originating mobile landing page 10. The script 46 attaches the digital representation of the scanned barcode 48, which may be the image of the barcode, to the session string 40. The capture of the barcode 55 by the camera 70 produces an image, or digitized barcode 48. The photographic image can be further processed on the device 100 to produce a digital alphanumeric string of the data encoded in the barcode 30. If the photographic image is passed to the mobile landing page 10, the image is further digitized 48 to the encoded alphanumeric string at the mobile landing page 10. The script 46 is responsible for providing the instructions to the camera 70 and device 100 to:
1. Activate the camera 70;
2. Look for a barcode 30 image;
3. Capture the barcode 55;
4. Digitize the barcode 48;
5. Add the digitized barcode 48 to the session string 40;
6. Pass the session string 40 to the originating landing page 10.

The landing page 10 may use the digitized barcode 48 to perform a variety of functions, such as:
1. Display the results of the scan on the landing page 10;
2. Search the website for content using the barcode 30 data;
3. Search the web using the barcode 30 data.

Benefits, other advantages, and solutions to problems have been described herein with regard to specific embodiments. However, the advantages, associated benefits, specific solutions to problems, and any element(s) that may cause any benefit, advantage, or solution to occur or become more pronounced are not to be construed as critical, required, or essential features or elements of any or all the claims of the invention. As used herein, the terms "comprises", "comprising", or any other variation thereof, are intended to cover a non-exclusive inclusion, such that a process, method, article, or apparatus composed of a list of elements that may include other elements not expressly listed or inherent to such process, method, article, or apparatus.

ADVANTAGES

From the description above, a number of advantages become evident for the "Barcode Scanner on Webpage." The present invention provides all new benefits for participating parties including programmers; advertisers and brand owners; operating system developers; and end-users, including:
1. allows advertisers to engage visitors on a mobile landing page while providing barcode scanning functionality on the native device;
2. allows application programmers to simplify mobile barcode scanning app development by avoiding programming to multiple platforms;
3. allows operating system developers to increase the use of native applications and hardware;
4. allows web page developers to use barcode scanning hardware and software on the native device.

What is claimed is:
1. A method for using a mobile device native resources by a landing page in a computer network environment, the method comprising: a. initiate barcode scanning from said landing page; b. generate a session string; c. transmitting, from said landing page, said session string to the mobile device; d. said session string calling a scanner on said mobile device; e. capturing a barcode with said scanner; f. digitizing said barcode; g. adding the digitized barcode to said session string; h. transmitting, from said mobile device, said session string to said landing page; whereby, the landing page is able to use a native camera and a barcode scanner application on the mobile device.

2. A method of claim 1, wherein said session string comprises an address of originating mobile landing page.

3. A method of claim 1, wherein said session string comprises a script.

4. A method of claim 1, wherein said session string comprises the script to launch a specified barcode scanner application.

5. A method of claim 1, wherein said digitized barcode comprises data.

6. A method of claim 1, wherein said digitized barcode comprises an image.

7. A method of claim 1, wherein said mobile device comprises displaying the landing page.

8. A method for using a mobile device's native resources by a landing page in a computer network environment, the method comprising: a. initiate barcode scanning from said landing page; b. generate a session string; c. transmitting, from said landing page, said session string to the mobile device; d. selecting a scanner; e. said session string calling the scanner on said mobile device; f. capturing a barcode with said scanner; g. digitizing said barcode; h. adding the digitized barcode to said session string; i. transmitting, from said mobile device, said session string to said landing page, whereby, the landing page is able to use an undetermined barcode scanner application on the mobile device.

9. A method of claim 8, wherein said session string comprises an address of originating mobile landing page.

10. A method of claim 8, wherein said session string comprises a script.

11. A method of claim 8, wherein said digitized barcode comprises data.

12. A method of claim 8, wherein said digitized barcode comprises an image.

13. A method of claim 8, wherein said mobile device comprises displaying the landing page.

14. A method for using a mobile device's native resources by a landing page in a computer network environment, the method comprising: a. initiate barcode scanning from said landing page; b. generate a session string; c. transmitting, from said landing page, said session string to the mobile device; d. said session string operating a camera on said mobile device; e. capturing a barcode with said camera; f. digitizing said barcode; g. adding the digitized barcode to said session string; h. transmitting, from said mobile device, said session string to said landing page; whereby, the landing page is able to use the camera on the mobile device.

15. A method of claim 14, wherein said session string comprises an address of originating mobile landing page.

16. A method of claim 14, wherein said session string comprises a script.

17. A method of claim 14, wherein said session string comprises a script to operate the camera.

18. A method of claim 14, wherein said digitized barcode comprises data.

19. A method of claim 14, wherein said digitized barcode comprises an image.

20. A method of claim 14, wherein said mobile device comprises displaying the landing page.

* * * * *